Patented Dec. 31, 1935

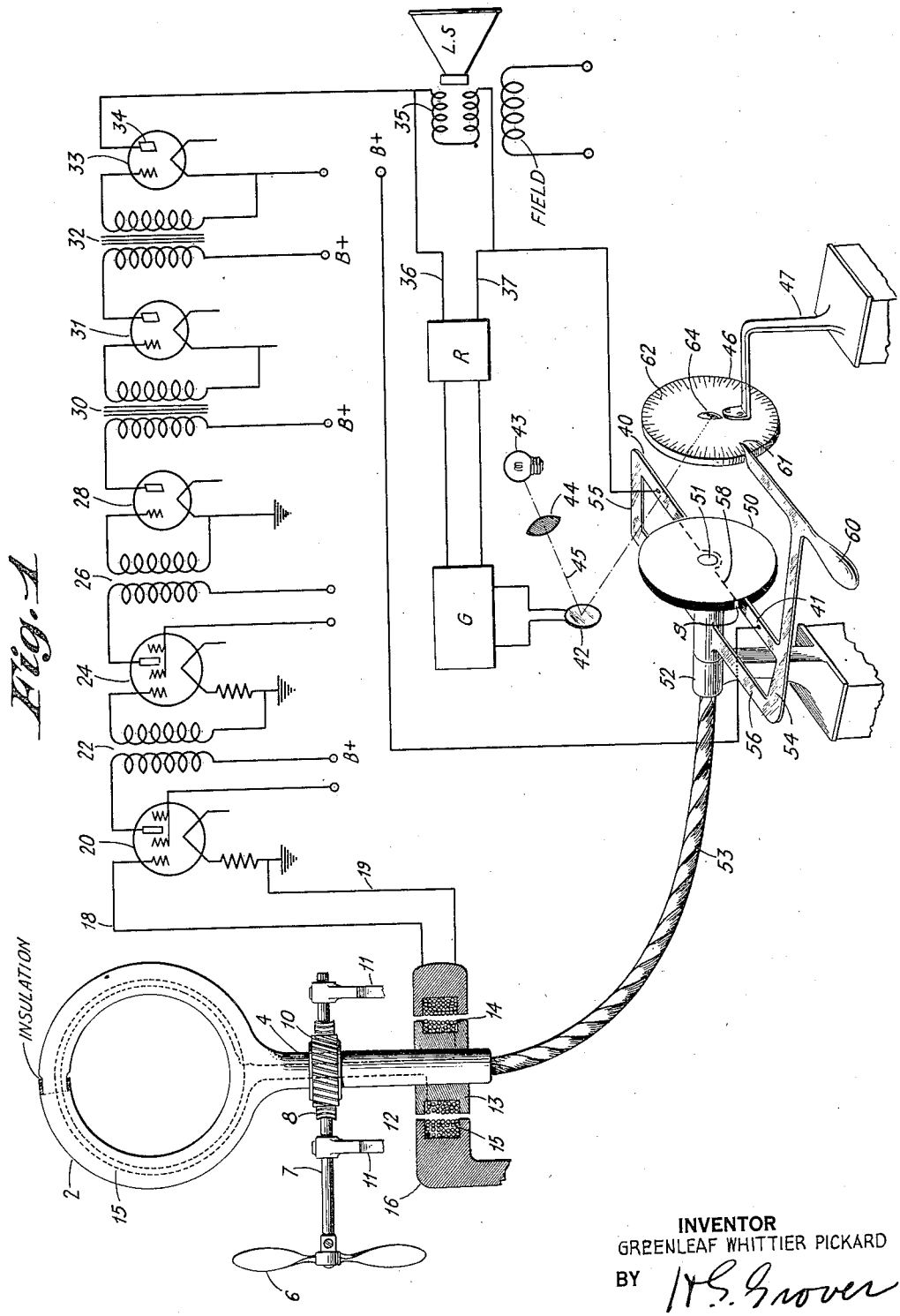

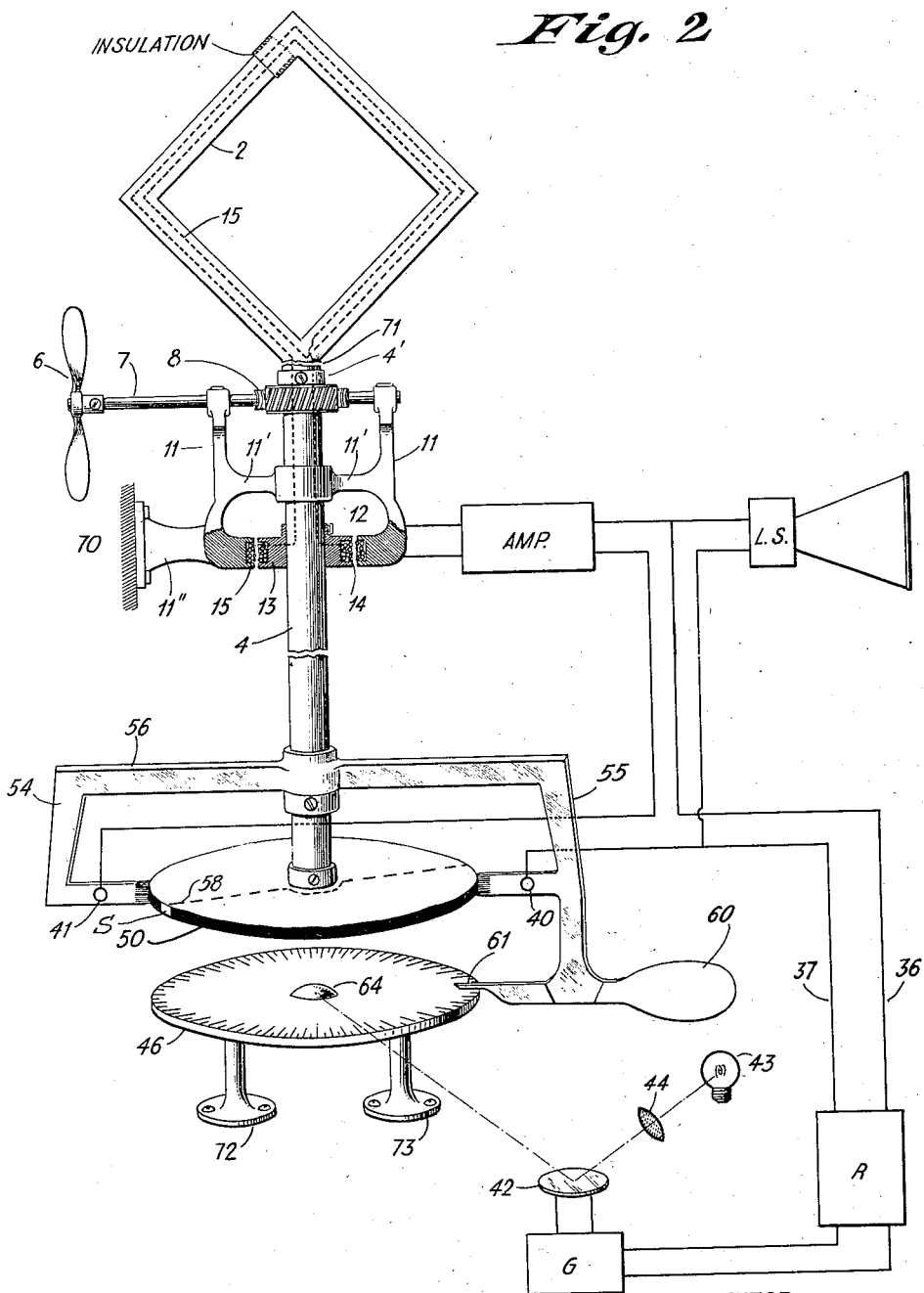

2,026,359

UNITED STATES PATENT OFFICE 2,026,359

DIRECTIVE RECEIVER

Greenleaf Whittier Pickard, Newton Center, Mass., assignor to Radio Corporation of America, a corporation of Delaware Application April 30, 1932, Serial No. 608,354

7 Claims. (Cl. 250—11)

Radio receivers, by means of which the direction from which the signals to which the receiver is tuned are coming may be ascertained, are known in the art. These receivers, known heretofore, in general comprise a signal absorption system which absorbs signal energy, the quantity of which depends upon the physical position of the absorption system relative to the source of signals, means for amplifying and/or rectifying the signals, and means for indicating the intensity of the signals absorbed and amplified and rectified. In known devices of this type the absorption system generally comprises what is known as the frame or loop aerial of my U. S. Patent 876,996 which consists of one or more turns of wire on a form, which may be rotated about its axis in such a manner as to place the plane of the turns of wire at any desired angle with respect to a line through the loop and through the signalling source. This loop structure is tuned to signal frequency by a variable capacity connected therewith. The energy from the loop or frame aerial is transmitted to metal rings mounted on the shaft and insulated from each other and this energy is transferred by way of brushes to the amplifier. This structure is necessary to permit rotation of the loop and to prevent the leads between the terminals of the loop and the amplifier or detector from becoming twisted or broken when the loop is rotated. Usually an aural indicator is connected with the detector or with amplifiers, which are in turn connected with the detector.

These receivers are in some respects satisfactory, but in others are unsatisfactory. For example, the contacts between the brushes and rings introduce capacity and sometimes high impedances in the leads from the loop or detector. These capacities and/or impedances vary during rotation of the loop and thereby vary the amount of energy reaching the amplifiers from the loop so that the energy impressed on the receiver amplifier is not truly representative of the energy absorbed by the absorption system. Also, the capacities between the rings and brushes may vary during rotation of the loop sufficiently to affect the tune of the loop to such an extent that the loop may be tuned to the signal in one position and may be detuned with respect to the signal in another position of rotation. Obviously, this will result in energy being impressed on the receiver which is not truly characteristic of the physical position of the loop relative to the source of signalling energy. In addition, owing to the low potentials of the loop circuit, such ring-brush contacts are imperfect, and often produce serious noise as the loop is rotated.

An object of the present invention is to provide a directional receiver in which provision is made to eliminate or overcome all of the above defects.

Receivers of this type are often used under conditions in which the operator's time and thoughts are entirely taken up with other duties and yet it is imperative that the operator know at all times the location of the source of signals with respect to his receiver. A receiver having an aural indicating means is in this case undesirable since it requires the mental attention of the operator in addition to the time necessary to operate the receiver. For example, where the receiver is located on an airship all of the above conditions are present and in addition thereto the noise level is so high that it is hard and even impossible in some cases for the operator to locate the direction of the source of signals by means of an aural indicator.

A specific object of the present invention is to provide a receiver by means of which the position of the signal source with respect to the receiver will always be obvious to the operator and in which the position of the source of signals with respect to the receiver will be indicated by either an aural or a visual indicator, as the operating conditions require. I have found that in general the ear responds to peak values of sound, whereas galvanometers or other visual indicator in general respond to r. m. s. values. So marked is this differentiation that consistent galvanometer readings of signals may generally be made in the presence of irregular disturbances of such magnitude, as to the ear, completely mask the signal. This is due to the fact that the ear does not integrate sound over appreciable intervals, which the galvanometer does, and that disturbances, such as static, ignition noise, etc., have low r. m. s. value as compared with the signal, even if their peak values are much higher.

A further object of the present invention is to provide an arrangement whereby the energy from the loop is transmitted to the receiver without the use of any contacting apparatus such as rings and brushes, which have been heretofore necessary to accomplish transmission of the energy from the loop to the receiver without the use of continuous leads which may become twisted or broken.

Numerous other objects and advantages will become apparent from the detailed description which follows:

Briefly, all of the above advantages and objects are attained in accordance with the present invention by the use of a shielded loop aerial mounted on a shaft, which may be driven continuously in any manner. The shaft has mounted thereon the primary of a transformer, the secondary winding of which is located in the field of the primary and coaxial with respect thereto so that a constant coupling between the primary winding and the secondary winding is maintained at all times irrespective of the relative rotation between the parts. The transformer windings are matched, or so proportioned to the impedance of the loop and the input impedance of the receiver as to effect the optimum transfer of energy, as is well-known in the art. The transformer has as nearly as possible unity coupling, that is to say, it is constructed to give the minimum possible magnetic leakage. A commutator, having a pair of metallic segments connected together and spaced 180 degrees apart on this periphery, is driven in synchronism with the rotation of the shaft. Brushes are located adjacent the periphery of this commutator and adapted to be rotated in such a manner that the brushes may be moved to any angular position on the commutator. The brushes are moved by means of a handle which cooperates with a scale, the outer periphery or rim of which has compass markings thereon, and the center of which has a ground glass target. The output of the secondary winding is connected with an amplifier, the output of which feeds a loud speaker connected in series through the brushes referred to above in the output circuit of the amplifier. A rectifier is connected in shunt with the loud speaker winding and feeds a galvanometer having a vibrated reflector. A light source and lens cooperate to throw a beam of light on the reflector at such an angle that the reflected beam will oscillate across the face of the scale under certain conditions. In operation the absorption system is continuously rotated in any manner. The commutator rotates in synchronism therewith. Every time the plane of the loop passes through the line between the loop and the signal source the amplitude of the energy is maximum and sets up an aural indication in the loud speaker and also energizes the rectifier which sends a pulse of unidirectional current to the galvanometer. This pulse oscillates the reflector of the galvanometer and causes the reflected light to move across the face of the scale. By moving the position of the brushes on the commutator a position may be reached at which the series circuit through the brushes and loud speaker is completed only when the plane of the loop is at right angles to the signalling source. Under these conditions the signal energy impressed on the loud speaker will be zero. Likewise, the energy to the rectifier will be zero and the movable mirror in the galvanometer will come to rest at a position such that the light beam reflected from the source to the galvanometer mirror and from there to the ground glass center of the scale will come to rest at the center point on the scale, thereby indicating that minimum signal is being received. The pointer on the handle will now indicate on the scale the direction of the signalling source.

The novel features of the invention have been pointed out with particularity in the claims appended hereto.

The nature of the invention and mode of operation thereof will be better understood from the detailed description which follows and therefrom when read in connection with the drawings throughout which like reference numerals indicate like parts and in which:

Figure 1 shows partly diagrammatic and partly schematic the receiver of the present invention; while Figure 2 shows a preferred form which the invention may take.

Referring to Figure 1 of the drawings, 2 indicates a loop aerial shield mounted for rotation on a shaft 4. The shaft 4 may be rotated by means of a motor 6 comprising a shaft 7 and a worm 8 cooperating with a worm 10 on the shaft 4. The shaft 7 may be mounted in any manner as for example in supports 11. The shaft 4 terminates in a transformer 12 having a primary winding core 13 on which a primary winding comprising a number of turns 14 is mounted. The turns 14 of the primary winding are connected by leads as shown with the inductance 15 in the shield 2. The secondary winding of the matched transformer 12 comprises a plurality of turns 15 mounted on the core 16 which also serves as a support for the winding. The terminals of the winding 15 are connected by leads to the grid 18 and cathode 19 of a thermionic tube 20 which is in turn coupled through a transformer 22 to the input electrodes of a second radio frequency amplifier 24 which has its output electrodes connected through a transformer 26 to the input electrodes of a detector 28. It will be understood that more or less amplifiers than are shown may be used and that the amplifiers and detectors shown are not meant to limit in any manner the nature of the thermionic relay interposed between the secondary and the loud speaker since it will be understood that any number of amplifiers or a single detector may be used depending on the circumstances under which the receiver is to be used.

The detector 28 has its output electrodes connected through a transformer 30 to the input electrodes of another thermionic repeater 31, which in turn is connected through a transformer 32 to an amplifier 33. The anode electrode 34 of tube 33 is connected in an output circuit which includes the winding 35 of an aural indicator as for example a loud speaker, and is completed by way of the brushes 40 and 41 cooperating with the commutator in a manner described more in detail hereinafter to the positive of a source of potential B. A rectifier R is connected by leads 36 and 37 in parallel with the winding 35 of the loud speaker LS. This rectifier may be of any known type and preferably one that comprises copper oxide plates. The output terminals of the rectifier R are connected with the input terminals of a galvanometer G. The galvanometer G which is of relatively low period that is with respect to the number of current pulses per second delivered by the commutator to be described more in detail hereinafter has a moving element 42 which vibrates at an amplitude which is determined by the position of the brushes 40 and 41 on the periphery of the commutator to be described later. A light source 43 cooperates with a lens 44 to direct a beam of light 45 on the movable element 42 of the galvanometer. This light beam after being reflected by the element 42 is thrown on an indicator scale 46 stationarily mounted on a support 47 coaxial with the commutator which will now be described. A commutator 50 is mounted on a shaft 51 for rotation in a support 52 in synchronism with the loop 2. This rotation in synchronism of the loop 2 and commutator 50 may be accomplished by means of a flexible shaft 53. The brushes 40 and 41 are mounted on supports 54 and 55 respectively to bear on the periphery of the commutator 50. The members 54 and 55 are supported in turn on a member 56, which may include an opening embracing the shaft 51 in such a manner that the brushes are maintained symmetrically 180 degrees apart on the periphery of the commutator 50. The members 54, 55 and 56 are of sufficient weight to prevent rotation thereof due to the friction between the brushes 40 and 41 and the periphery of the commutator 50. If the weight of these elements is insufficient to prevent rotation of the support and brushes other means not shown may be provided. On the periphery of the commutator 50 are located a pair of segments S, the two segments being located 180 degrees apart and being connected together by a connector 58, as indicated, in such a manner that when the brush 41 bears on one of the pair of segments, and the brush 40 bears on the other of said pair of segments, the circuit between the output electrodes of the tube 33 is completed. The member 54 of the support for the brushes has integral therewith a handle 60 having a pointer 61 cooperating with compass markings 62 on the periphery of the scale 46. The scale 46 has at the center a ground glass portion 64 on which the beam of light 45 is adapted to fall when the oscillating member 42 of the galvanometer G comes to rest.

The operation of the invention is thought to be clear from the foregoing detailed description of the invention and from the statement of the operation given hereinbefore.

However, the operation of the receiver will again be repeated.

In operation the loop 2 is continuously rotated. The commutator 50 is rotated in synchronism therewith. If the handle 60 is in such a position that the indicator does not indicate the position (using null point reception) of the source of signals on each rotation of the loop each completion of the circuit through the anode electrodes of the tube 34 signal energy will flow in the output circuit. This signal energy acting in the galvanometer G will vibrate the member 42 and cause the ray of light 45 to oscillate across the ground glass portion 64 of the scale 46, thereby indicating that the pointer 61 has not been moved into a position at which the circuit through brushes in the output circuit 33 is completed at the same time that the loop 2 is in a position at which its plane is at right angles to the source of signals when the output circuit of 34 is completed. By moving the handle 60 and pointer 61 to a certain position, such that the circuit through the brushes 41, 40 is completed when the loop 2 is at right angles to the source of signals, the energy flowing in the output circuit of 35 will be zero, the galvanometer G will not be actuated, and the oscillating member 42 will come to rest at a point such that the beam of light 45 will fall on the center of the ground glass portion of 64 of scale indicator 46, thereby indicating the direction of the source of signals.

In Figure 2 a practical application of the receiver has been shown. This modification need not be described other than to point out that the entire apparatus may be ranged in a compact assembly, as shown, and may be supported by means of a support 70 which, in addition to supporting the entire apparatus, except for the scale, forms a rotatable mounting for the motor 6, 8 and a rotatable mounting for the shaft 2, which may be broken as indicated at 71 and/or at 72, and in addition forms the core for the secondary winding of the matched transformer 12. The indicator 46 is located coaxial with the commutator 50 and below said commutator in a position to be readily visible to the operator. The scale 46 has the compass markings on the outer upper rim thereof which cooperate with the pointer 61 to indicate the position of the source of signals. The scale 46 may be mounted in any manner, as, for example, by means of supports 72 and 73, as indicated. In this modification the amplifier has been shown diagrammatically as has been the loud speaker LS. The operation, however, of this system is the same. In this modification, however, the light source 43 and galvanometer G, with moving element 42, is located below the scale 46 so that the reflected light ray 45 falls on the under side of the ground glass portion 64 of the scale 46.

It is obvious that this apparatus may also be used for direction finding without involving either continuous rotation of the loop or visible indication. By disconnecting, as by a suitable clutch, the driving means 6, 7, 8, and providing a scale and index for disc 50, manual rotation of disc 50 will rotate loop 2, and the direction ascertained aurally, as by loudspeaker LS, or the customary head phones. The change from automatic to manual operation can be made in a few seconds, and when used manually it has the advantage of freedom from contact and other troubles inherent in the conventional brush and slip ring.

Having thus described my invention and the operation thereof, what I claim is:

1. The combination of a rotatable directional radiant absorption member, a commutator rotatable in synchronism therewith, an amplifier coupled with said absorption member, a pair of adjustable brushes cooperating with said commutator and connected in series with said amplifier output electrodes to complete a circuit between said output electrodes in adjustable positions of rotation of said commutator and absorption member, a rectifier connected with the output circuit of said amplifier, a galvanometer including a movable reflector member connected with said rectifier, the position of said reflector being determined by the nature of the energy applied to said galvanometer from said rectifier, and a source of light cooperating with said reflector member and said scale to indicate on the latter the position of said absorption member when said circuit through said commutator is completed.

2. A visual direction indicator comprising a continuously rotatable loop, a matched transformer having a primary winding connected with said loop and continuously rotatable with said loop, a commutator having a pair of segments on its periphery, means for rotating said commutator in synchronism with said loop, an amplifier having its input terminals connected with the secondary winding of said matched transformer and its output terminals connected in circuit with adjustable brushes cooperating with said commutator, a galvanometer connected with said amplifier output to be energized thereby, said galvanometer having a movable reflector the movement of which depends on the position of said brushes and the position of said loop when said brushes and commutator complete the circuit connected with the output terminals of said amplifier, a light source and a lens adapted to concentrate a ray of light from said source on said movable element of the galvanometer, and a scale in the path of said ray of light when reflected, said scale having a ground glass portion on which the light ray will fall when said movable element comes to rest, and a pointer fastened to said adjustable brushes and cooperating with said scale to indicate the position at which the circuit through said commutator and brushes is completed.

3. The combination of a rotatable directional aerial an amplifier coupled thereto, a commutator which has imparted thereto movements similar to movements which may be imparted to said aerial, a pair of adjustable brushes associated with said commutator and connected with said amplifier output terminals to complete an output circuit for said amplifier in adjustable positions of said commutator, a light source, a scale, means connected to said circuit connected with said amplifier output terminals for controlling the direction taken by the light rays leaving said light source relative to said scale, in accordance with the nature of the energy in said amplifier output circuit, and a pointer connected with said brushes and said scale to indicate the position at which the circuit connected with said amplifier output electrodes is completed by said commutator and brushes.

4. A visual direction indicator comprising a movable directional aerial, a matched transformer having a primary winding connected to said aerial and movable with said aerial, a commutator having a pair of segments on its periphery, means for moving said commutator in a manner characteristic of movements of said aerial, an amplifier having its input terminals connected with the secondary winding of said matched transformer, a circuit connecting the output terminals of said amplifier with adjustable brushes cooperating with said commutator, a galvanometer connected with said last named circuit, said galvanometer having a movable reflector the movement of which is determined by the nature of the energy applied to said galvanometer, a light source and a lens adapted to concentrate a ray of light from said source on said movable element of the galvanometer, and a scale having a recording portion in the path of said ray of light when reflected and a pointer fastened to said adjustable brushes and cooperating with said scale.

5. The combination of a rotatable loop, a commutator rotatable in synchronism therewith, an amplifier coupled to said loop, a pair of adjustable brushes cooperating with said commutator and connected in series with said amplifier output circuit, an impedance in said output circuit, a rectifier connected in parallel with said impedance, a galvanometer connected with said rectifier, said galvanometer controlling the position of a reflecting element, a light source and a scale associated with said reflecting element, and a pointer cooperating with said scale to indicate the position of said brushes relative to said commutator.

6. A visual direction indicator comprising a continuously rotatable loop, a matched transformer having a primary winding connected with and continuously rotatable with said loop, a commutator having a pair of segments on its periphery, means for rotating said commutator in synchronism with said loop, means including an adjustable brush holder having brushes cooperative with said commutator for providing a directional indication, an amplifier having its input terminals connected in series with the secondary winding of said matched transformer and its output terminals connected in series with said brushes, a rectifier connected with said output circuit, a galvanometer connected with said rectifier, said galvanometer having a movable reflector, the position of which is determined by the amplitude of the energy fed from said output circuit to said rectifier, a light source and a lens adapted to concentrate a ray of light from said source on said movable element of the galvanometer, and a scale member having a translucent portion in the path of said ray of light when reflected, and having graduations against which the position of said brush holder may be registered.

7. A directional receiving system comprising a directive absorption member, the position of which may be moved relative to a source of signalling energy to vary the amount of energy absorbed by said member, a thermionic relay having its input electrodes coupled to said member and its output electrodes coupled to a normally open circuit, a commutator connected to said absorption member for movement therewith, adjustable brushes connected with said output circuit and cooperating with said commutator to close said output circuit in pre-determined positions of movement of said absorption member and commutator, which positions may be changed by adjusting the position of said brushes, a galvanometer connected to said output circuit to be energized thereby when said circuit is closed, said galvanometer having a movable reflector which is moved from a zero position, when said output circuit is closed, an amount determined by the amplitude of the energy in said output circuit, a scale having a ground glass portion on which light reflected from said reflector in a zero position falls and a pointer connected with said brushes and cooperating with said scale, to indicate the position of said brushes when the energy in said output circuit when completed is not sufficient to cause said reflector to leave its normal zero position.

GREENLEAF WHITTIER PICKARD.